UNITED STATES PATENT OFFICE.

CARL A. MARTINS, OF BERLIN, PRUSSIA, GERMANY.

METHYL-BLUE COLOR.

SPECIFICATION forming part of Letters Patent No. 246,327, dated August 30, 1881.

Application filed March 7, 1881. (Specimens.)

*To all whom it may concern:*

Be it known that I, Dr. CARL ALEXANDER MARTINS, a resident of the city of Berlin, in the Kingdom of Prussia, German Empire, have invented a new and useful Process for the Production of a Blue Coloring-Matter, of which the following is a specification.

The coloring-matter known in trade by the name of "Methyl-orange" or "Orange III," and having the following composition, $C_{14}H_{14}N_3So_3Na$, is heated in a closed digester up to about 105° to 110° centigrade with an excess of sulphohydrate of ammonia. The product of this digestion is separated by filtration from the precipitated sulphur and oxidized with perchloride of iron by the well-known reaction taught by Lauth. The blue coloring-matter formed in this way is precipitated with a solution of chloride of zinc and purified by redissolving it in water and precipitating again with salt.

The coloring-matter is easily soluble in water, less soluble in spirit. It is reduced by powder of zinc, sulphohydrate, or other reducing agents, but oxidizing agents reproduce the color easily. On the whole the coloring-matter is employed in the same way as magenta, showing, when dyed, the fine blue hue of the corn-flower, (*Centaurea*.) On silk and wool it is applied without mordant, but on cotton and linen a mordant is required.

The sulpho-anilic acid obtained as a by-product in the above-described process can be employed for the manufacture of other colors.

I claim as my invention—

1. The above-described process for the manufacture of a blue coloring-matter by reducing the so called "Orange III" with sulphohydrate of ammonia and oxidizing it afterward by means of perchloride of iron.

2. The above-described blue coloring-matter produced by the reduction of methyl-orange No. 3 by the action of sulphohydrate of ammonia thereon and afterward oxidized by the action of perchloride of iron.

In testimony whereof I have signed this specification in the presence of two subscribing witnesses.

CARL ALEXANDER MARTINS.

Witnesses:
 BERTHOLD ROI,
 BANCROFT C. DAVIS.